United States Patent Office 2,878,287
Patented Mar. 17, 1959

2,878,287

PROCESS FOR PREPARING SYMMETRICAL HEXACHLORODIPHENYL UREA

Arthur A. Levine and Thurman V. Williams, Jr., Niagara Falls, N. Y., assignors to E. I. du Pont de Nemours & Company, Wilmington, Del., a corporation of Delaware No Drawing. Application June 9, 1945
Serial No. 598,664

2 Claims. (Cl. 260—553)

This invention relates to a new and improved process for the preparation of symmetrical hexachlorodiphenyl urea by reacting 2,4,6-trichloroaniline and urea in glacial acetic acid. More particularly, it relates to feeding hydrogen chloride into the reaction mixture to obtain improved yields.

Symmetrical hexachlorodiphenyl urea has been prepared by a batch process wherein at least 2 mols of 2,4,6-trichloroaniline were reacted with 1 mol of urea in glacial acetic acid. According to such procedure, the reaction mixture was refluxed at atmospheric pressure for 2 hours, during which period sulfuric acid was added slowly, the amount of sulfuric acid being determined by spot tests using methyl violet indicator paper.

The purpose of the sulfuric acid is to increase the yield and also the react and remove liberated ammonia from the field of reaction. If no sulfuric acid is employed in the reaction, the conversion of 2,4,6-trichloroaniline with urea to symmetrical hexachlorodiphenyl urea goes to approximately 22% of theory, and the refluxing of the reaction mixture must be carefully watched because continued refluxing of the reaction mixture causes a disappearance of the symmetrical hexachlorodiphenyl urea which had been previously formed. If too much sulfuric acid is added to the reaction mixture, the desired product is not obtained or the formation of undesirable by-products results in a lowered yield. Manifestly, the amount of sulfuric acid added to the reaction mixture is important particularly for high yields.

So far as can be ascertained, sulfuric acid was the only acid used in the conversion of 2,4,6-trichloroaniline with urea to symmetrical hexachlorodiphenyl urea. Apparently, this was so because sulfuric acid can be readily obtained in anhydrous form and is liquid at ordinary temperatures. Also, since anhydrous sulfuric acid is liquid at ordinary temperatures, it was believed that the amount thereof added to the reaction mixture could be properly controlled.

The use of methyl violet as an indicator to control the amount of sulfuric acid added to the reaction mixture is highly unsatisfactory because it changes color only when too much acid has been added, with the consequence that a low yield of the product was obtained.

An object of this invention is to provide a new and improved process for the preparation of symmetrical hexachlorodiphenyl urea by reacting 2,4,6-trichloroaniline with urea.

Another object of this invention is to provide a process for the preparation of symmetrical hexachlorodiphenyl urea by reacting 2,4,6-trichloroaniline with urea wherein gaseous hydrogen chloride is added during the course of the reaction to obtain improved yields.

An additional object of this invention is to provide a process for accurately controlling the amount of hydrogen chloride added during the process of preparing symmetrical hexachlorodiphenyl urea by reacting 2,4,6-trichloroaniline with urea.

Other and additional objects will become apparent hereinafter.

The invention is based on the discovery that, when 2,4,6-trichloroaniline is reacted with urea in acetic acid, improved yields are obtained by adding gaseous hydrogen chloride to the reaction mixture in such amounts that the reaction mixture will give readings between 1.0 and 3.0 on a pH meter having glass and calomel electrodes. The readings on the pH meter may not be true pH values of the reaction mixture but, whatever they may be, when the amount of feed of hydrogen chloride is such that the reaction mixture throughout the course of the reaction gives readings of from 1.0 to 3.0 on the pH meter, improved yields are obtained.

The objects of the invention are accomplished, in general, by adding hydrogen chloride to the reaction mixture of 2,4,6-trichloroaniline and urea in acetic acid in such amounts so as to obtain readings between 1.0 and 3.0 on a pH meter having glass and calomel electrodes throughout the course of the reaction.

The details and manner of practicing the invention will become apparent from the following specific example, the proportions being by weight:

*Example*

The following charge was introduced into a 2-liter flask equipped with a stirrer, reflux condenser and feed inlet for (gaseous) hydrogen chloride:

1000 cc. glacial acetic acid
135 grs. 2,4,6-trichloroaniline
69 grs. urea

The flask was placed in an oil bath and heated to a temperature to reflux the flask's contents and such temperature was maintained throughout the reaction. During refluxing, gaseous hydrogen chloride was added to the reaction mixture over a period of 2 hours at a rate to give readings of 1.33 to 2.7 on the pH meter. At the conclusion of the refluxing, the feed of the hydrogen chloride was stopped and the reaction mixture was filtered whereby the symmetrical hexachlorodiphenyl urea was separated. The yield of symmetrical hexachlorodiphenyl urea obtained was 56% based on the 2,4,6-trichloroaniline charge. The filtrate was utilized in making up subsequent charges.

Theoretically, symmetrical hexachlorodiphenyl urea can be produced by reacting 2 mols of 2,4,6-trichloroaniline with 1 mol of urea. In the instant invention, however, it is preferred to use an excess of urea. In general, the urea is used in an amount of from 200% to 800% of the theoretical amount required.

In the example, the 2,4,6-trichloroaniline is present in the batch in an amount which constitutes approximately 13.5% (by weight) based on the acetic acid. It is to be understood that the invention is not restricted to such concentration. The concentration of 2,4,6-trichloroaniline in the acetic acid must be in excess of 5%, since below 5% no symmetrical hexachlorodiphenyl urea is obtained. The highest concentration of 2,4,6-trichloroaniline in acetic acid depends upon the freezing point of the mixture. Of course, for any concentration of 2,4,6-trichloroaniline, the composition will also contain an appropriate amount of urea.

The temperature at which the reaction is carried out is limited to the boiling point of the reaction mixture, which obviously varies with the concentration of the reactants and by-products dissolved in the reaction mixture, as well as the pressure under which the reaction is carried out. As shown by the example, the reaction is carried out under atmospheric pressure but it can also be carried out at pressures above atmospheric. The ratio of the reactants may be varied with different pressures, and this can be determined by simple empirical experiments.

In the example, the gaseous hydrogen chloride was added at a rate so that the reaction mixture would give readings between 1.33 and 2.7 on a pH meter having glass and calomel electrodes. Though this range is preferred since it gives optimum results, nevertheless satisfactory results can be obtained when the readings on the pH meter have been maintained as low as 1.0 and as high as 3.0 on the pH meter.

The measurements on the pH meter can be taken periodically or continuously throughout the course of the reaction. The electrodes of the pH meter can be inserted in the reaction mixture whereby the measurements are taken continuously and the hydrogen chloride is added, when necessary, to maintain the reading of the reaction mixture within the desired range on the pH meter. Alternatively, periodic samples of the reaction mixture can be taken and, after cooling the samples to some reference temperature, say 30° C., the measurements can be taken. The hydrogen chloride is added, when necessary, to bring the readings of the reaction mixture within the desired range on the pH meter.

Though the invention has been described in connection with a batch process, it is to be understood that the invention is not restricted thereto since the principles thereof can be applied to a continuous process. In a continuous process, an initial charge (2,4,6-trichloroaniline, urea and acetic acid) was introduced into a reactor having a stirrer, two separate feed inlets and a side arm outlet. After the charge had been introduced into the reactor, the reactor was heated and the contents thereof allowed to reflux. During refluxing, a feed consisting of a slurry comprising 2,4,6-trichloroaniline and urea in acetic acid was continuously fed through one of the feed inlets. Gaseous hydrogen chloride was fed throughout the course of the run through the other inlet at a rate which gave readings of 1.0 to 3.0 on the pH meter. The reaction mixture was allowed to spill out through the side arm outlet in an amount equal to the feeds and the symmetrical hexachlorodiphenyl urea was filtered therefrom. The filtrate was used in making up the feed continuously added to the reactor. The proportions of 2,4,6-trichloroaniline, urea and acetic acid in the feed continuously added to the reaction mixture are within the limits hereinbefore set forth.

The rate of addition of the feed to the reactor is important. A too low feed rate will reduce yields and increase by-products. A too high rate of feed will result in incomplete conversion. In general, the feed is continuously added to the reaction mixture as a rate so that the contents of the reactor will be completely changed in an appropriate period of time, such as, for example, 2 to 3 hours.

2,4,6-trichloroaniline is obtained by hydrolyzing the hydrochloride thereof which is prepared by chlorinating aniline in a reaction medium During that reaction, hydrogen chloride is liberated and vented. This hydrogen chloride can be utilized in the instant process.

In place of hydrogen chloride, phosphoric acid can be used provided the pH of the reaction mixture is maintained as herein described.

The instant invention provides a new method of preparing symmetrical hexachlorodiphenyl urea from 2,4,6-trichloroaniline and urea by the use of controlled addition of hydrogen chloride, which can be obtained from any suitable source, such as, for example, from the process of the preparation of 2,4,6-trichloroaniline hydrochloride where it is a by-product. The use of by-product hydrogen chloride in this process makes it economical. The manner of controlling the amount of hydrogen chloride not only increases yields in the batch process but makes a continuous process practical.

Since it is obvious that many changes and modifications can be made in the above-described details without departing from the nature and spirit of the invention, it is to be understood that the invention is not to be limited thereto except as set forth in the appended claims.

We claim:

1. In the method for preparation of symmetrical hexachlorodiphenyl urea by the reaction of 2,4,6-trichloroaniline with urea in acetic acid, the improvement which comprises feeding hydrogen chloride into the reaction mixture in such amounts that the reaction mixture will give throughout the course of the reaction readings of 1.0 to 3.0 on a pH meter having glass and calomel electrodes.

2. In the method for the preparation of symmetrical hexachlorodiphenyl urea by the reaction of 2,4,6-trichloroaniline with urea in acetic acid, the improvement which comprises feeding hydrogen chloride into the reaction mixture in such amounts that the reaction mixture wil give throughout the course of the reaction readings of 1.33 to 2.7 on a pH meter having glass and calomel electrodes.

No references cited.